United States Patent
Kane et al.

(10) Patent No.: US 9,411,953 B1
(45) Date of Patent: Aug. 9, 2016

(54) TRACKING INJECTED THREADS TO REMEDIATE MALWARE

(71) Applicant: Symantec Corporation, Mountain View, CA (US)

(72) Inventors: David Kane, Los Angeles, CA (US); Wilson Meng, San Gabriel, CA (US)

(73) Assignee: Symantec Corporation, Mountain View, CA (US)

( * ) Notice: Subject to any disclaimer, the term of this patent is extended or adjusted under 35 U.S.C. 154(b) by 60 days.

(21) Appl. No.: 13/902,345

(22) Filed: May 24, 2013

(51) Int. Cl.
*G06F 21/52* (2013.01)

(52) U.S. Cl.
CPC .................................. *G06F 21/52* (2013.01)

(58) Field of Classification Search
CPC ......... G06F 21/52; G06F 12/14; G06F 21/56; G06F 21/554; G06F 21/564; G06F 21/566; H04L 63/145; H04L 63/1441; H04L 63/0227
USPC .............................................. 726/23, 24, 25
See application file for complete search history.

(56) References Cited

U.S. PATENT DOCUMENTS

| | | | |
|---|---|---|---|
| 8,515,075 B1 * | 8/2013 | Saraf et al. ............... | 380/277 |
| 8,719,924 B1 * | 5/2014 | Williamson et al. ........ | 726/22 |
| 8,745,741 B1 * | 6/2014 | Tice ......................... | G06F 9/00 713/164 |
| 2009/0199297 A1 * | 8/2009 | Jarrett .................. | G06F 21/566 726/24 |
| 2010/0107249 A1 * | 4/2010 | Krig ...................... | G06F 21/57 726/22 |
| 2010/0235913 A1 * | 9/2010 | Craioveanu ........... | G06F 21/563 726/23 |
| 2011/0041179 A1 * | 2/2011 | St Hlberg .................. | 726/23 |
| 2011/0265182 A1 * | 10/2011 | Peinado et al. ............ | 726/24 |
| 2011/0289586 A1 * | 11/2011 | Kc et al. ................... | 726/24 |
| 2012/0167120 A1 * | 6/2012 | Hentunen ................. | 719/320 |
| 2012/0254995 A1 * | 10/2012 | Sallam ..................... | 726/22 |
| 2013/0290662 A1 * | 10/2013 | Teal ........................ | 711/163 |

* cited by examiner

*Primary Examiner* — Harunur Rashid
(74) *Attorney, Agent, or Firm* — Fenwick & West LLP

(57) ABSTRACT

Injected threads are tracked to detect malware that injects malicious code into the address space of a legitimate process. Relationships between threads of processes executing on a client and files stored by the client are mapped to identify files that create threads in executing processes. The address space of a process is analyzed to identify legitimate memory regions in the address space. A suspicious thread referencing a suspicious memory region of the address space outside of the legitimate memory regions is identified. The suspicious memory region is scanned to identify malware. The mapped relationships are used to identify the file that created the thread that referenced the address space in which the malware was identified. The malware in the file is remediated.

18 Claims, 5 Drawing Sheets

TRACKING INJECTED THREADS TO REMEDIATE MALWARE

BACKGROUND OF THE INVENTION

1. Field of the Invention

This invention pertains in general to computer security and in particular to remediating malware that uses process thread injection to avoid detection.

2. Description of the Related Art

There is a wide variety of malicious software (malware) that can attack modern computers. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer.

Modern malware is often targeted and delivered to only a relative handful of computers. For example, a Trojan horse program can be designed to target computers in a particular department of a particular enterprise. Moreover, mass-distributed malware can contain polymorphisms that cause the malware to vary over time. Such malware is difficult for security software to detect because there are few instances of the same malware, and the security software might not be configured to recognize the particular instance that has infected a given computer.

Malware can also use additional techniques to evade detection. Once such technique is called "remote thread injection." Here, the malware injects the malicious code into the address space of a legitimate (i.e., non-malicious) process. Even if the security software detects the injected malicious code, it is difficult for the security software to identify the file that caused the injection. As a result, the security software cannot fully remediate the malware.

BRIEF SUMMARY

Disclosed embodiments include a method, client, and non-transitory computer-readable storage medium for detecting malicious files. An embodiment of the method comprises identifying a suspicious thread referencing a suspicious memory region in an address space of a process executing on the client, scanning the suspicious memory region in the address space of the process referenced by the suspicious thread for malware, and responsive to the scanning, detecting malware in the suspicious memory region and identifying a malicious file associated with the suspicious thread.

An embodiment of the client comprises a non-transitory computer-readable storage medium storing computer program modules executable to perform steps, comprising identifying a suspicious thread referencing a suspicious memory region in an address space of a process executing on the client, scanning the suspicious memory region in the address space of the process referenced by the suspicious thread for malware, and responsive to the scanning, detecting malware in the suspicious memory region and identifying a malicious file associated with the suspicious thread. The client further comprises a computer processor for executing the computer program modules.

An embodiment of the non-transitory computer-readable storage medium stores computer program modules executable to perform steps comprising identifying a suspicious thread referencing a suspicious memory region in an address space of a process executing on the client, scanning the suspicious memory region in the address space of the process referenced by the suspicious thread for malware, and responsive to the scanning, detecting malware in the suspicious memory region and identifying a malicious file associated with the suspicious thread.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
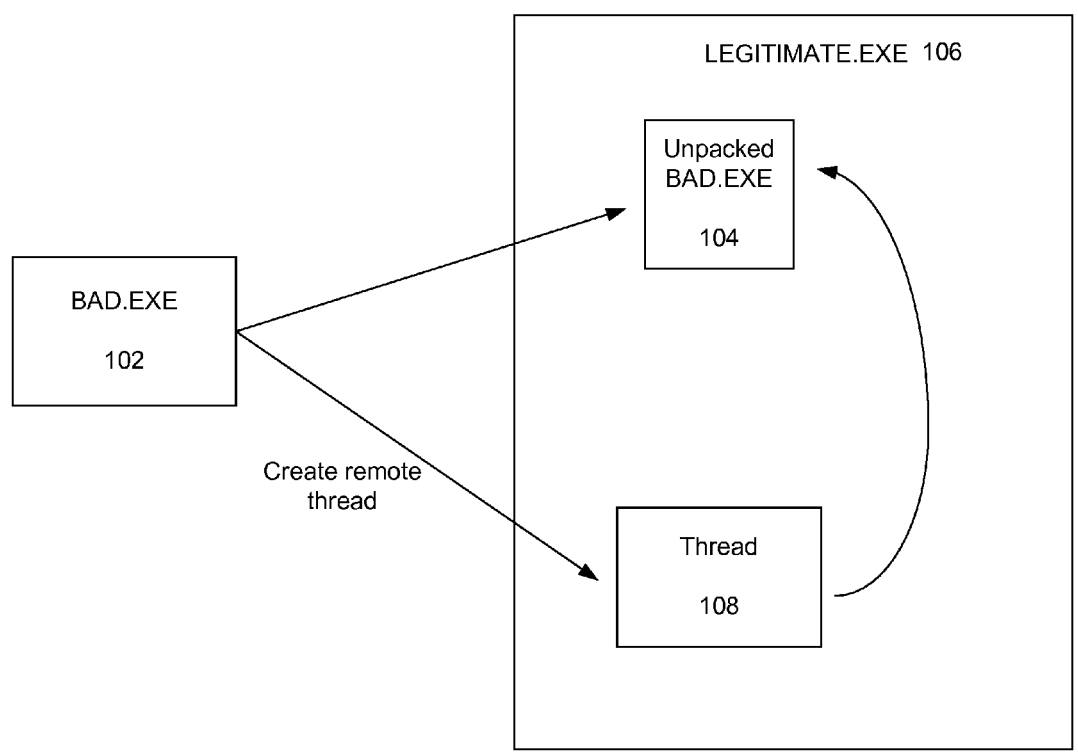
FIG. 1 is a high-level block diagram illustrating how malware uses remote thread injection to avoid detection.

FIG. 1 is a high-level block diagram illustrating how malware uses remote thread injection to avoid detection. In the figure, a malware file 102 (labeled as "BAD.EXE") is present on a client, such as a computer. Malware is generally defined as software that executes on the client surreptitiously, or software that has some surreptitious functionality. The malware file 102 may be "packed" (e.g., compressed and encrypted) using a polymorphic technique so that different instances of the malware file appear different. As a result, the malware file 102 is difficult for security software to detect.

The malware file 102 executes as a process on the client. The file 102 may start executing using one or more of a variety of techniques. For example, the malware file 102 may appear to be legitimate (not malicious) and start executing at the direction of the user of the client. The malware file 102 may also start executing without the user's knowledge due to an exploit that comprises other software executing on the client.

In addition, the client executes one or more legitimate files as processes. FIG. 1 illustrates one such legitimate process 106 (labeled "LEGITIMATE.EXE"). The legitimate processes may include processes that exist as part of the client's operating system. For example, "EXPLORER.EXE" and "SERVICES.EXE" are two such legitimate processes associated with variants of the Microsoft Windows operating system.

When the malware file 102 executes, it "unpacks" (e.g., decrypts and decompresses) its malicious code into an address space in the memory of the client from which the malicious code can be executed. However, the malware file 102 does not unpack the malicious code into the address space of the process for the malware file 102. Instead, the malware file 102 uses tools provided by the client's operating system to unpack the malicious code 104 into the address space of the legitimate process 106. In addition, the malicious file 102 uses additional operating system tools to create a remote thread 108 in the address space of the legitimate process 106. This remote thread 108 executes and, in turn, executes the malicious code 104 to perform malicious actions. The malware file 102 may then terminate its process, leaving only the injected malicious code.

Figure 2:
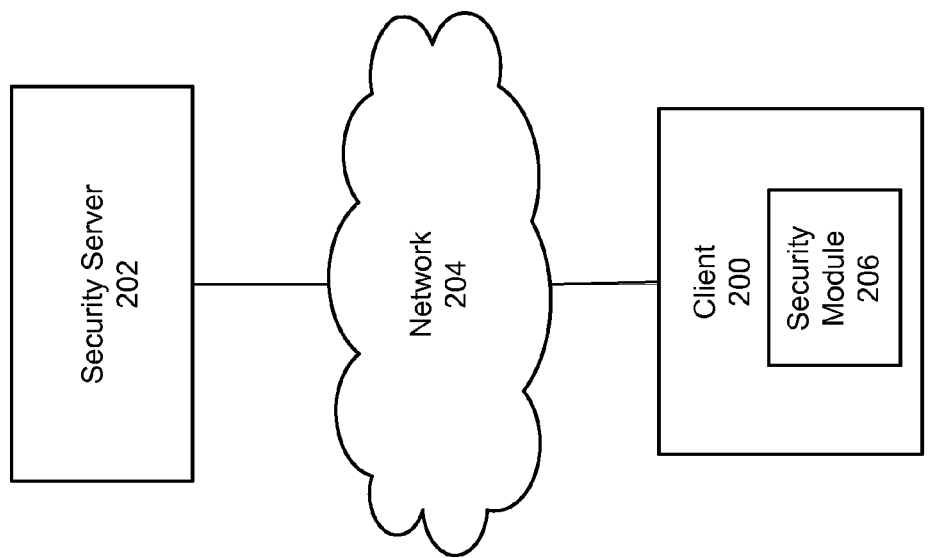
FIG. 2 is a high-level block diagram of a computing environment for detecting malware attacks like that described with respect to FIG. 1 according to one embodiment.

FIG. 2 is a high-level block diagram of a computing environment for detecting malware attacks like that described with respect to FIG. 1 according to one embodiment. FIG. 2 illustrates a security server 202 and a client 200 connected by a network 204. Only one client 200 is displayed in order to simplify and clarify the description. Embodiments of the computing environment can have thousands or millions of clients 200. Some embodiments also have multiple security servers 202.

The client 200 is an electronic device that can host malware. In one embodiment, the client 200 is a conventional computer executing, for example, a Microsoft Windows-compatible operating system (OS), Apple OS X, and/or a Linux distribution. The client 200 can also be another device having computer functionality, such as a tablet computer, mobile telephone, video game system, etc. The client 200 typically stores numerous computer files that can host malicious software.

The client 200 executes a security module 206 for detecting and remediating malware on the client. The security module 206 can be incorporated into the OS of the client 200 or part of a separate security package. In one embodiment, the security module 206 is provided by the same entity that operates the security server 202. The security module 206 communicates with the security server 202 via the network to obtain detection data for detecting malware at the client. The detection data include malware signatures describing attributes of malware that can be used to detect an instance of the malware at the client.

In one embodiment, the security module 206 monitors the client 200 using the detection data to detect malware attacks that use remote thread injection. Generally, the security module 206 monitors the client 200 to detect when threads are created. When the security module 206 detects a thread creation, it records the identity of the process executing on the client 200 that created the thread, and the file on the client that executed as the process. Thus, the security module 206 maintains a mapping of threads to files that created the threads.

In addition, the security module 206 examines the address spaces of processes executing on the client 200. This examination identifies memory regions within the processes' address spaces that contain known legitimate code. For example, the examination may reveal regions within a process's address space that includes code loaded from known legitimate dynamic link libraries ("DLLs") provided by the operating system.

The security module 206 also enumerates threads of processes executing on the client 200. For each thread of a process, the security module 206 determines whether the thread is associated with a region in the process's address space that contains known legitimate code. If the thread is not associated with a region containing known legitimate code, the thread, and the region with which the thread is associated, are suspicious. Accordingly, the security module 206 examines the region using the detection data to determine whether the region contains malware. If so, the security module 206 uses the mapping of threads to files that created the threads to identify the file on the client 200 that created the thread associated with the region that contains malware. This file likely contained the malware that was injected into the legitimate process.

The security module 206 then remediates the malware in the identified file. The security module 206 can perform one or more actions to remediate the malware, such as quarantining the malware or removing the malware file from the client 200. The security module 206 may also generate a report indicating that the identified file contains malware. The report notifies a user of the client 200 and/or another entity, such as an administrator of the client 200, of the detected malware.

The security server 202 is a hardware device and/or software module configured to generate and distribute the detection data to the client 200. An example of the security server 202 is a web-based system providing security software and services to the security module 206 of the client 200. Depending on the embodiment, one or more of the functions of the security server 202 can be provided by a cloud computing environment. As used herein, "cloud computing" refers to a style of computing in which dynamically scalable and often virtualized resources are provided as a service over the network 204. Functions attributed to the client 200 and security module 206 can also be provided by the cloud computing environment.

The network 204 represents the communication pathways between the security server 202, client 200, and any other entities on the network. In one embodiment, the network 204 is the Internet and uses standard communications technologies and/or protocols. In other embodiments, the entities use custom and/or dedicated data communications technologies.

Figure 3:
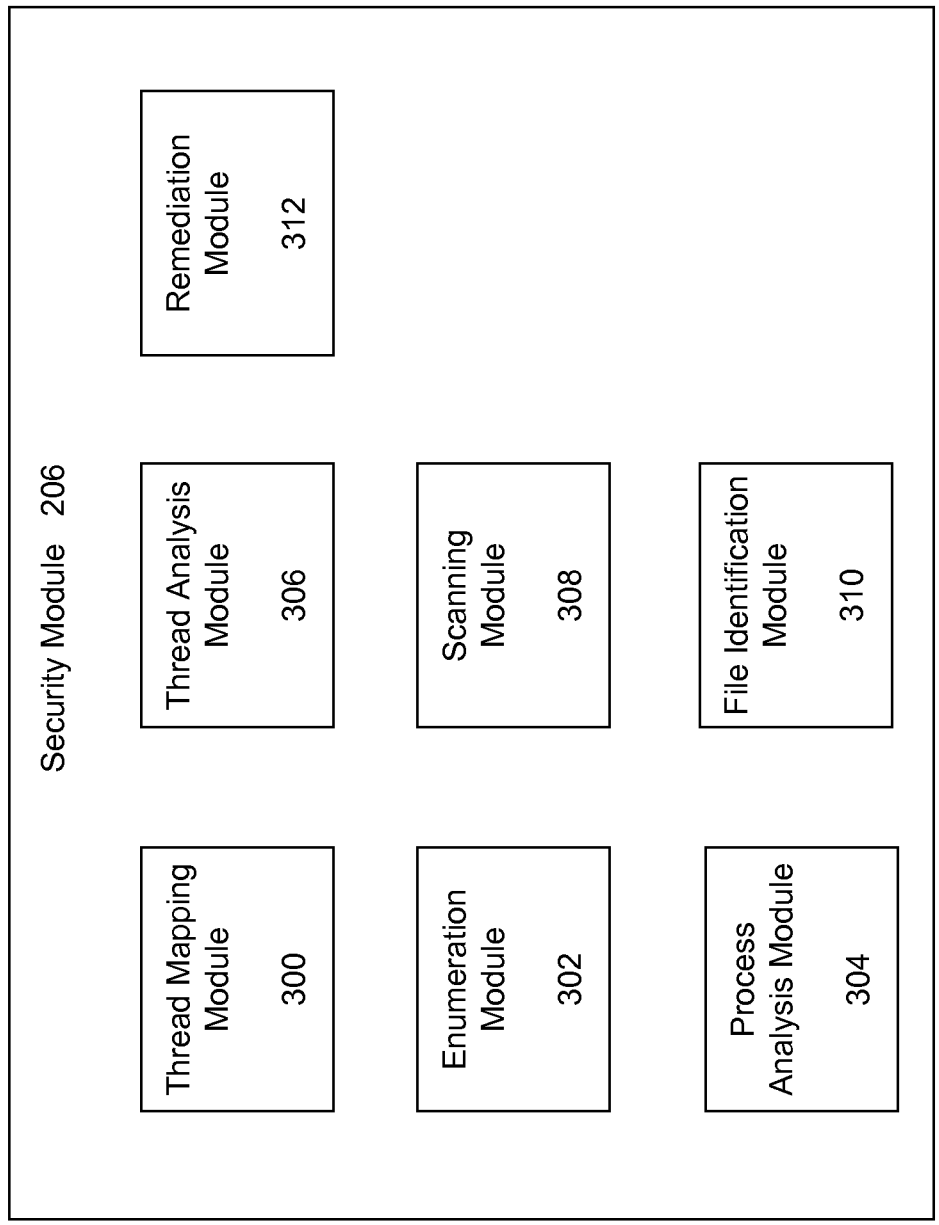
FIG. 3 is a high-level block diagram illustrating a detailed view of the security module of the client according to one embodiment.

FIG. 3 is a high-level block diagram illustrating a detailed view of the security module 206 of the client 200 according to one embodiment. As shown in FIG. 3, the security module 206 itself includes multiple modules performing functions for detecting and remediating malware. In some embodiments, the functions are distributed among these modules in a different manner than described herein. In addition, the security module 206 may include additional and/or different modules for detecting and remediating malware using other techniques.

A thread mapping module 300 maps relationships between threads of processes executing on the client 200 and files stored by the client. In one embodiment, the thread mapping module 300 hooks into the operating system kernel in a manner that allows it to detect each thread creation event performed by the operating system, and to collect data about each event. The collected data includes the identity of the created thread, the identity of the process that created the thread, and the identity of the file stored by the client 200 that was executed to form the process (also known as the file that "backed" the process). The thread mapping module 300 maintains a database that describes, or maps, the relationship between the files, processes, and threads. Thus, given an identifier (ID) of a thread, the mapping in the database can identify the process that created the thread and, in turn, the file that backed the process. In one embodiment, the thread mapping module 300 provides a service that receives a thread ID and responds with the identity of the file backing the process that created the identified thread.

An enumeration module 302 identifies processes and threads executing on the client 200. In one embodiment, the enumeration module 302 interacts with an interface (e.g., an application programming interface, or API) provided by the operating system of the client 200 to enumerate all of the processes currently executing on the client. The enumeration module 302 also interfaces with the operating system to enumerate the threads executing within the address space of the processes. Depending upon the embodiment, the enumeration module 302 may enumerate the threads of all, or of a selected subset, of the processes executing on the client 200. For example, the security module 206 may not enumerate threads of processes associated with the security module, and/or other processes. Each process and thread is identified by a unique ID, typically assigned by the operating system.

A process analysis module 304 analyzes the address spaces of processes executing on the client 200, such as the processes enumerated by the enumeration module 302. For a given process, the process analysis module 304 identifies memory regions within the address space of the process that are known to contain legitimate code (i.e., to not contain malware). That is, the process analysis module 304 identifies regions that are backed by code sections known to be legitimate. In one embodiment, the process analysis module 304 builds a map that indicates the locations of these legitimate regions in the process's address space. The process analysis module 304 may build this map by interacting with an interface provided by the operating system that identifies the DLLs and/or other code sections loaded by a process, and the regions in the process's address space occupied by the loaded code sections.

A thread analysis module 306 analyzes the enumerated threads of a process to identify suspicious threads. To analyze a given thread, an embodiment of the thread analysis module 306 examines the call stack of the thread to determine whether the call stack contains a reference to location in the process's address space outside of the legitimate memory regions. Specifically, the thread analysis module 306 "walks" the call stack of the thread to determine the return address of the thread (i.e., the memory address in the process's address space to which control returns when the thread finishes execution). The thread analysis module 306 then uses the map of legitimate memory regions generated by the process analysis module 304 to determine whether the return address points to a location within a legitimate region. If the return address is not within a legitimate region, the return address is designated as "suspicious."

The thread analysis module 306 designates threads having suspicious return addresses as "suspicious" because such threads might contain malware. Suspicious threads are not necessarily malicious because some legitimate processes contain threads with suspicious return addresses. For example, processes that perform just-in-time (JIT) compilation of source code might contain threads with suspicious return addresses.

A scanning module 308 identifies suspicious regions in a process's address space and scans such regions for malware. In one embodiment, the scanning module 308 identifies suspicious regions associated with suspicious threads of the process. Specifically, given a suspicious thread having a suspicious return address, the scanning module 308 determines the dimensions (i.e., boundaries) of the memory region containing the suspicious location. In one embodiment, the scanning module 308 determines the dimensions by interfacing with the operating system to identify the dimensions of the allocated block of memory containing the suspicious return address. For example, the scanning module 308 may call the VirtualQueryEx( ) function provided by the Microsoft Windows operating system to determine the dimensions of the region containing the suspicious address. The region defined by these dimensions is the suspicious region.

The scanning module 308 scans the suspicious region for malware. The suspicious region presumably contains the executable code of the suspicious thread. Moreover, the code may be unpacked executable code introduced into the process via a malicious remote thread injection attack. The scanning module 308 therefore scans the suspicious region using the detection data received from the security server 202 to determine whether the suspicious region contains malware. In one embodiment, the scanning module 308 conducts the scan by constructing a virtual portable executable (PE) file containing the data in the suspicious region. The scanning module 308 then scans the virtual PE file using detection data adapted to find malware within PE files.

If the scan detects malware, then the malware was likely injected into the process by malicious code in an executable file stored by the client 200. A file identification module 310 determines the identity of the file that injected the malware. To perform this task, the file identification module 310 determines the ID of the suspicious (now known to be malicious) thread having the return address to the memory region found to contain malware. The file identification module 310 can determine the ID, e.g., by querying the operating system. The file identification module 310 then accesses the service provided by the thread mapping module 300 to determine the identity of the file backing the process that created the malicious thread. The identified file likely contains the malware that was injected into the legitimate process. Thus, the file on the client 200 containing the malware is identified, even though the file is packed in a way that hides the malware.

A remediation module 312 remediates the malware. The remediation module 312 may perform actions including generating a report notifying a user of the client 200 and/or another entity, such as an administrator of the client, of the detected malware. The remediation module 312 may also block malicious actions performed by the malware, quarantine and/or delete the file containing the malware, and/or perform other actions to remove the malware from the client 200. The remediation module 312 may further provide a sample of the file and/or another description of the malware to the security server 202 for further analysis.

Figure 4:
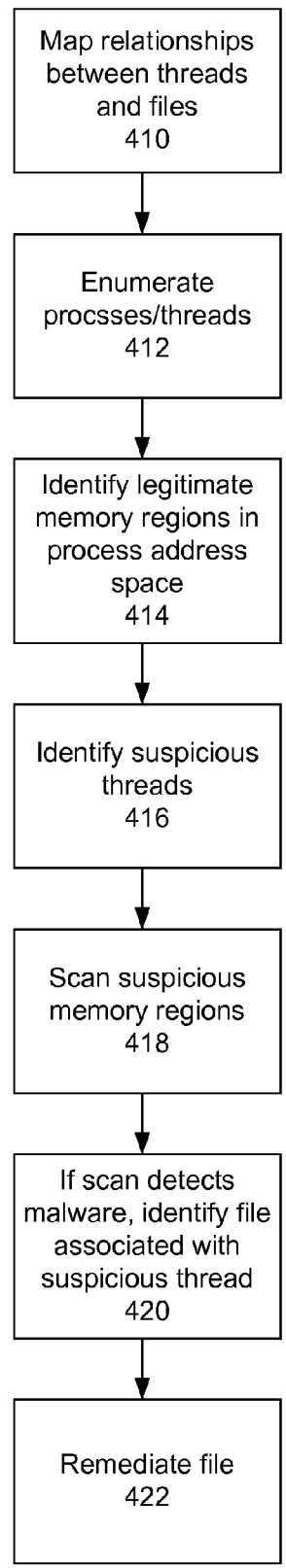
FIG. 4 is a flow chart illustrating steps performed by the security module of the client to detect and remediate malware according to one embodiment.

FIG. 4 is a flow chart illustrating steps performed by the security module 206 of the client 200 to detect and remediate malware according to one embodiment. Other embodiments can perform different and/or additional steps. Moreover, other embodiments can perform the steps in different orders. Further, some or all of the steps can be performed by entities other than the security module 206.

The security module 206 maps 410 relationships between threads of processes executing on the client 200 and files stored on the client. In one embodiment, the security module 206 detects thread creation events performed by the operating system of the client 200. In addition, the security module 206 collects data about each created thread, including the identities of the thread, the executing process that created the thread, and the file that backed the process. The security module 206 maintains a database that maps the relationships between the files, processes, and threads described by the collected data. The security module 206 may detect the thread creation events in the background, asynchronously from the other steps described in FIG. 4.

The security module 206 also enumerates 412 processes executing on the client 200. In one embodiment, the security module 206 interfaces with the operating system of the client 200 to enumerate all of the processes currently executing on the client. The security module 206 may enumerate the processes at specified times and/or upon the occurrence of a specified event. For example, the security module 206 may enumerate the processes every few minutes, upon detection of a file being downloaded to the client 200, upon detection of a suspicious event on the client, or at other times. The security module 206 additionally enumerates 412 the threads of the enumerated processes. The security module 206 may enumerate the threads of all processes executing on the client 200 or for a selected subset of the processes.

For a given process for which the threads were enumerated, the security module 206 identifies 414 memory regions within the address space of the process that are known to contain legitimate code. The security module 206 identifies the DLLs and/or other code sections loaded by the process, and the regions in the process's address space occupied by the loaded code sections. These regions are legitimate regions because they are known to contain legitimate code.

The security module 206 uses the legitimate memory regions to identify 416 any suspicious threads of the process. In one embodiment, the security module 206 examines the call stacks of the enumerated threads of the process to determine whether any thread contains a reference to a location in the process's address space outside of the legitimate memory regions. A reference to a location outside of the legitimate regions is suspicious. For example, if the return address in a thread's call stack points to a location outside of a legitimate memory region, both the return address and the thread are suspicious.

The security module 206 identifies suspicious memory regions of a process's address corresponding to the suspicious threads. For a given suspicious thread having a suspicious location (e.g., return address), the security module 206 determines the dimensions of the memory region containing that location in the process's address space. The security module 206 then scans 418 this suspicious memory region for malware. If the scan detects malware, it means the suspicious thread was likely injected into the process by a malicious executable file stored by the client 200.

The security module 206 therefore identifies 420 the file associated with the suspicious thread. One embodiment of the security module 206 queries the operating system to determine the ID of the suspicious thread. The security module 206 then uses the map describing the relationships between threads of processes executing on the client 200 and files stored on the client to determine the file associated with the suspicious thread. The security module 206 remediates 422 the file by, e.g., removing the file associated with the suspicious thread from the client 200.

Figure 5:
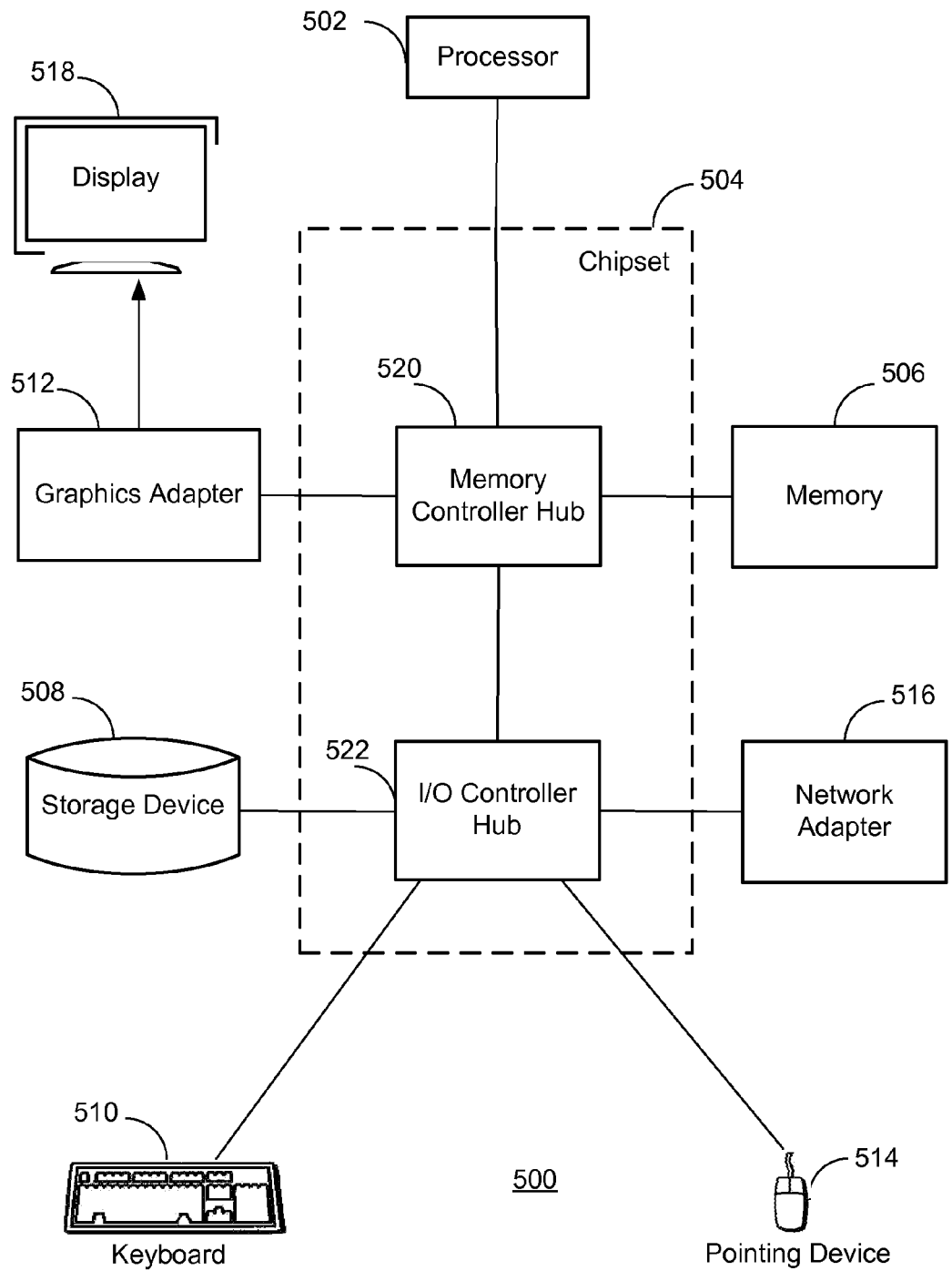
FIG. 5 is a high-level block diagram illustrating a typical computer for use as the security server or client.

FIG. 5 is a high-level block diagram illustrating a typical computer 500 for use as the security server 202 or client 200. Illustrated are a processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device and stores computer files containing executable code and/or data. The memory 506 holds instructions and data used by the processor 502. The pointing device 514 is a mouse, touch-sensitive display, or other type of pointing device, and is used in combination with the keyboard 510 to input data into the computer system 500. The graphics adapter 512 displays images and other information on the display 518. The network adapter 516 couples the computer 500 to the network 204.

As is known in the art, a computer 500 can have different and/or other components than those shown in FIG. 5. In addition, the computer 500 can lack certain illustrated components. In one embodiment, a computer 500 acting as a security server 202 is formed of multiple blade computers and lacks a keyboard 510, pointing device 514, graphics adapter 512, and/or display 518. Moreover, the storage device 508 can be local and/or remote from the computer 500 (such as embodied within a storage area network (SAN)).

This description uses the term "module" to refer to computer program logic for providing a specified functionality. A module can be implemented in hardware, firmware, and/or software. A module is typically stored on a computer-readable storage medium such as the storage device 508, loaded into the memory 506, and executed by the processor 502.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of detecting a malicious file at a client, comprising:

detecting thread creation events performed by an operating system of the client;

collecting data about detected thread creation events, the collected data for a thread creation event including an identity of a created thread, an identity of a process that created the thread, and an identity of a file stored by the client that was executed to form the process that created the thread;

analyzing an address space of a process executing on the client to identify legitimate memory regions in the address space known to not contain malware;

identifying a thread of the process executing on the client referencing a location in the address space of the process outside of the legitimate memory regions, the location designated as a suspicious memory region;

designating the thread referencing the suspicious memory region as a suspicious thread;

identifying a malicious file associated with the suspicious thread by accessing the collected data about detected thread creation events to identify a file stored by the client that was executed to form a process that created the suspicious thread, identifying the malicious file comprising:

determining an identifier of the suspicious thread by querying the operating system for the identifier of the suspicious thread and receiving the identifier of the suspicious thread from the operating system in response to the query;

providing the identifier of the suspicious thread to a service that receives a thread identifier identifying a thread and responds with an identity of a file that created the identified thread, the service using the collected data about detected thread creation events; and receiving from the service, in response to providing the identifier of the suspicious thread, an identifier of the malicious file associated with the suspicious thread; and remediating the malicious file associated with the suspicious thread.

2. The method of claim 1, further comprising:

enumerating a plurality of threads executing within the address space of the process;

wherein the suspicious thread is identified from among the enumerated plurality of threads.

3. The method of claim 1, further comprising:

maintaining a database that maps relationships between threads of processes executing on the client and files stored by the client using the collected data about detected thread creation events.

4. The method of claim 1, wherein identifying the thread referencing the location in the address space of the process outside of the legitimate memory regions comprises:
  walking a call stack of the thread to determine whether the call stack includes a return address pointing to the location in the address space outside of the legitimate memory regions.

5. The method of claim 1, further comprising:
  determining dimensions of a memory region in the address space of the process containing the location in the address space; and
  designating the memory region having the determined dimensions as the suspicious memory region.

6. The method of claim 1, wherein remediating the malicious file associated with the suspicious thread comprises generating a report indicating that the malicious file contains malware.

7. A client for detecting a malicious file, comprising:
  a non-transitory computer-readable storage medium storing computer program modules executable to perform steps comprising:
    detecting thread creation events performed by an operating system of the client;
    collecting data about detected thread creation events, the collected data for a thread creation event including an identity of a created thread, an identity of a process that created the thread, and an identity of a file stored by the client that was executed to form the process that created the thread;
    analyzing an address space of a process executing on the client to identify legitimate memory regions in the address space known to not contain malware;
    identifying a thread of the process executing on the client referencing a location in the address space of the process outside of the legitimate memory regions, the location designated as a suspicious memory region;
    designating the thread referencing the suspicious memory region as a suspicious thread;
    identifying a malicious file associated with the suspicious thread by accessing the collected data about detected thread creation events to identify a file stored by the client that was executed to form a process that created the suspicious thread, identifying the malicious file comprising:
      determining an identifier of the suspicious thread by querying the operating system for the identifier of the suspicious thread and receiving the identifier of the suspicious thread from the operating system in response to the query;
      providing the identifier of the suspicious thread to a service that receives a thread identifier identifying a thread and responds with an identity of a file that created the identified thread, the service using the collected data about detected thread creation events; and
      receiving from the service, in response to providing the identifier of the suspicious thread, an identifier of the malicious file associated with the suspicious thread; and
    remediating the malicious file associated with the suspicious thread; and
  a computer processor for executing the computer program modules.

8. The client of claim 7, the computer program modules executable to perform further steps comprising:
  enumerating a plurality of threads executing within the address space of the process;
  wherein the suspicious thread is identified from among the enumerated plurality of threads.

9. The client of claim 7, the computer program modules executable to perform further steps comprising:
  maintaining a database that maps relationships between threads of processes executing on the client and files stored by the client using the collected data about detected thread creation events.

10. The client of claim 8, wherein identifying the thread referencing the location in the address space of the process outside of the legitimate memory regions comprises:
  walking a call stack of the thread to determine whether the call stack includes a return address pointing to the location in the address space outside of the legitimate memory regions.

11. The client of claim 7, wherein identifying the suspicious thread referencing the suspicious memory region further comprises:
  determining dimensions of a memory region in the address space of the process containing the location in the address space; and
  designating the memory region having the determined dimensions as the suspicious memory region.

12. The client of claim 7, wherein remediating the malicious file associated with the suspicious thread comprises generating a report indicating that the malicious file contains malware.

13. A non-transitory computer-readable storage medium storing computer program modules for detecting a malicious file at a client, the computer program modules executable to perform steps comprising:
  detecting thread creation events performed by an operating system of the client;
  collecting data about detected thread creation events, the collected data for a thread creation event including an identity of a created thread, an identity of a process that created the thread, and an identity of a file stored by the client that was executed to form the process that created the thread;
  analyzing an address space of a process executing on the client to identify legitimate memory regions in the address space known to not contain malware;
  identifying a thread of the process executing on the client referencing a location in the address space of the process outside of the legitimate memory regions, the location designated as a suspicious memory region;
  designating the thread referencing the suspicious memory region as a suspicious thread;
  identifying a malicious file associated with the suspicious thread by accessing the collected data about detected thread creation events to identify a file stored by the client that was executed to form a process that created the suspicious thread, identifying the malicious file comprising:
    determining an identifier of the suspicious thread by querying the operating system for the identifier of the suspicious thread and receiving the identifier of the suspicious thread from the operating system in response to the query;
    providing the identifier of the suspicious thread to a service that receives a thread identifier identifying a thread and responds with an identity of a file that created the identified thread, the service using the collected data about detected thread creation events; and receiving from the service, in response to providing the identifier of the suspicious thread, an identifier of the malicious file associated with the suspicious thread; and remediating the malicious file associated with the suspicious thread.

14. The storage medium of claim 13, the computer program modules executable to perform further steps comprising:

enumerating a plurality of threads executing within the address space of the process;

wherein the suspicious thread is identified from among the enumerated plurality of threads.

15. The storage medium of claim 13, the computer program modules executable to perform further steps comprising:

maintaining a database that maps relationships between threads of processes executing on the client and files stored by the client using the collected data about detected thread creation events.

16. The storage medium of claim 13, wherein identifying the thread referencing the location in the address space of the process outside of the legitimate memory regions comprises:

walking a call stack of the thread to determine whether the call stack includes a return address pointing to the location in the address space outside of the legitimate memory regions.

17. The storage medium of claim 13, wherein identifying the thread referencing the location in the address space of the process outside of the legitimate memory regions further comprises:

determining dimensions of a memory region in the address space of the process containing the location in the address space; and designating the memory region having the determined dimensions as the suspicious memory region.

18. The method of claim 1, further comprising:

providing the service that receives a thread identifier identifying a thread and responds with an identity of a file that created the identified thread.

* * * * *